(12) United States Patent
Gruszecki et al.

(10) Patent No.: US 12,072,882 B2
(45) Date of Patent: Aug. 27, 2024

(54) DATABASE QUERY PROCESSING

(71) Applicant: INTERNATIONAL BUSINESS MACHINES CORPORATION, Armonk, NY (US)

(72) Inventors: Artur M. Gruszecki, Cracow (PL); Tomasz Sekman, Cracow (PL); Tomasz Kazalski, Balice (PL); Andrzej Jan Wrobel, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 16/867,152

(22) Filed: May 5, 2020

(65) Prior Publication Data

US 2021/0349902 A1   Nov. 11, 2021

(51) Int. Cl.
*G06F 16/2453* (2019.01)
*G06F 21/62* (2013.01)

(52) U.S. Cl.
CPC .... *G06F 16/24544* (2019.01); *G06F 21/6227* (2013.01)

(58) Field of Classification Search
CPC .............. G06F 16/24544; G06F 21/6227
USPC .............................................. 707/714
See application file for complete search history.

(56) References Cited

U.S. PATENT DOCUMENTS

| 5,787,428 A | 7/1998 | Hart |
| 8,161,527 B2 | 4/2012 | Curren |
| 8,478,713 B2 | 7/2013 | Cotner et al. |
| 2005/0177570 A1* | 8/2005 | Dutta ................. G06F 21/6227 |
| 2005/0289342 A1 | 12/2005 | Needham et al. |
| 2009/0030907 A1* | 1/2009 | Cotner ............... G06F 21/6227 |
| 2009/0327242 A1 | 12/2009 | Brown |
| 2010/0189251 A1* | 7/2010 | Curren ............... G06F 21/6227 380/28 |
| 2012/0036162 A1 | 2/2012 | Gimbel |

(Continued)

OTHER PUBLICATIONS

Oracle, "8 Enforcing Row-Level Security with Oracle Label Security," Oracle Database Online Documentation Library, 12c Release 1 (12.1.0.2), pp. 1-24, downloaded from internet Nov. 13, 2019.

(Continued)

*Primary Examiner* — Joshua Bullock
(74) *Attorney, Agent, or Firm* — Lily Neff; George S. Blasiak; Heslin Rothenberg Farley & Mesiti PC

(57) ABSTRACT

Methods, computer program products, and systems are presented. The method computer program products, and systems can include, for instance: examining an invoked database query for execution on a database; scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system; identifying, using the zone data, at least one excludible extent of the storage system extents; and excluding the at least one excludible extent from an IO data access operation in processing of the invoked database query.

20 Claims, 7 Drawing Sheets

(56) References Cited

U.S. PATENT DOCUMENTS

2017/0293657 A1* 10/2017 Kirk .................. G06F 16/24549
2017/0331782 A1* 11/2017 Lai ...................... G06F 16/9535

OTHER PUBLICATIONS

Montee, Geoff, "Protect Your Data: Row-level Security in MariaDB 10.0," MariaDB, Jun. 2, 2015, pp. 1-14.
Teradata, "Implementing Row Level Security," Teradata Database Security Administration, Nov. 14, 2019, p. 1.
List of IBM Patent and/or Patent Applications treated as related for U.S. Appl. No. 16/867,228, filed May 5, 2020, dated Nov. 22, 2022.

* cited by examiner

DATABASE QUERY PROCESSING

BACKGROUND

The present disclosure related generally to databases and specifically to query execution in a database.

Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table.

Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table.

Data structures have been employed for improving operation of a computer system. A data structure refers to an organization of data in a computer environment for improved computer system operation. Data structure types include containers, lists, stacks, queues, tables, and graphs. Data structures have been employed for improved computer system operation e.g. in terms of algorithm efficiency, memory usage efficiency, maintainability, and reliability.

SUMMARY

Shortcomings of the prior art are overcome, and additional advantages are provided, through the provision, in one aspect, of a method. The method can include, for example: examining an invoked database query for execution on a database; scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system; identifying, using the zone data, at least one excludible extent of the storage system extents; and excluding the at least one excludible extent from an IO data access operation in processing of the invoked database query.

In another aspect, a computer program product can be provided. The computer program product can include a computer readable storage medium readable by one or more processing circuit and storing instructions for execution by one or more processor for performing a method. The method can include, for example: examining an invoked database query for execution on a database; scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system; identifying, using the zone data, at least one excludible extent of the storage system extents; and excluding the at least one excludible extent from an IO data access operation in processing of the invoked database query.

In a further aspect, a system can be provided. The system can include, for example, a memory. In addition, the system can include one or more processor in communication with the memory. Further, the system can include program instructions executable by the one or more processor via the memory to perform a method. The method can include, for example: examining an invoked database query for execution on a database; scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system; identifying, using the zone data, at least one excludible extent of the storage system extents; and excluding the at least one excludible extent from an IO data access operation in processing of the invoked database query.

Shortcomings of the prior art are overcome, and additional advantages are provided, through the provision, in one aspect, of a method. The method can include, for example: scanning zone data from at least one data node of a database, the at least one data node of the database having a storage system and storing in the storage system table data of a table, wherein differentiated security tags are associated to respective rows of the table, wherein the zone data includes statistical data of the table differentiated between storage system extents of the storage system; identifying, using the zone data, at least one excludible extent of the storage system extents; and processing a database query in dependence on the identifying.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
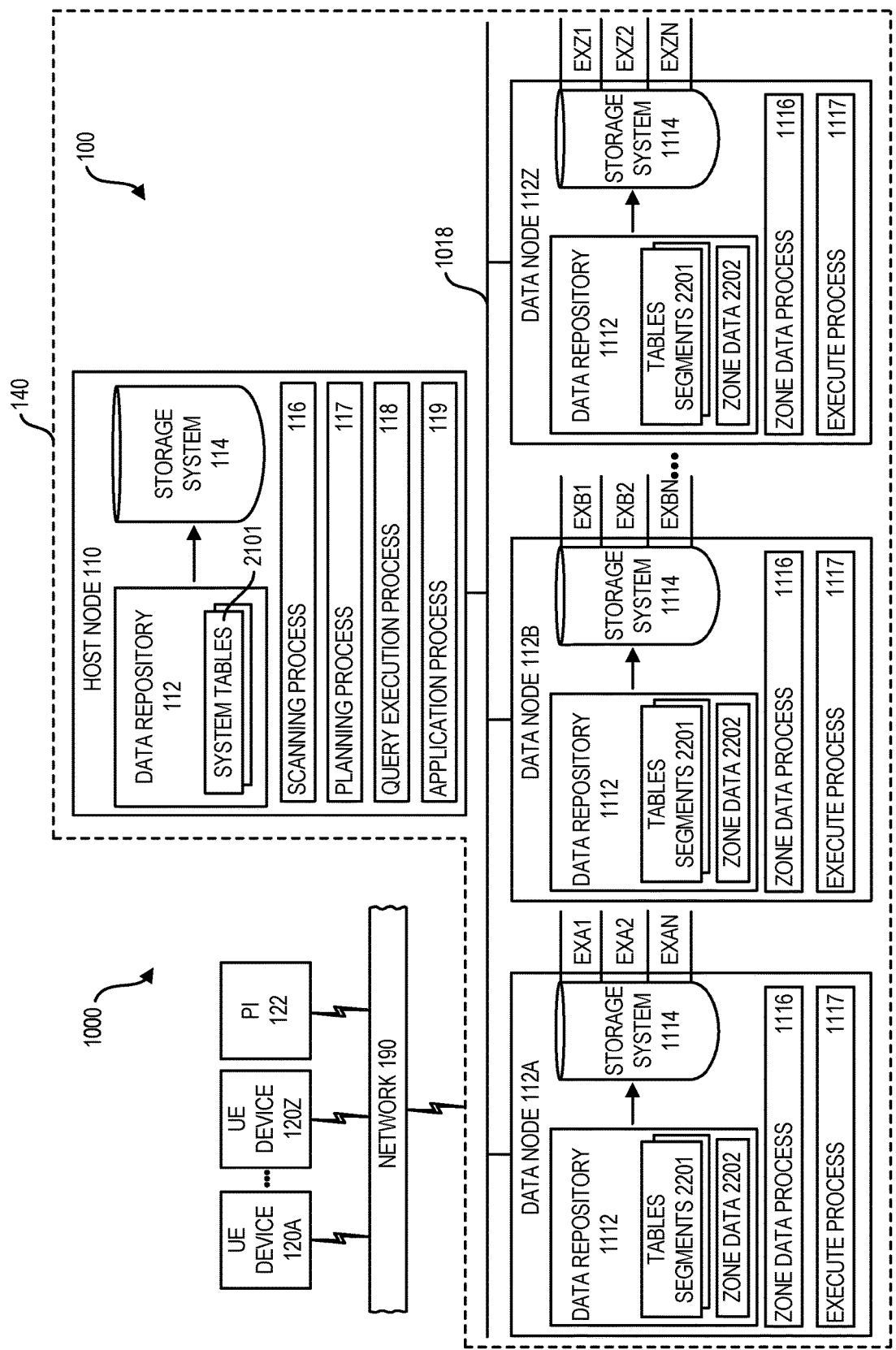
FIG. 1 depicts a system having a database, user equipment devices and a process interface according to one embodiment.

System 1000 for use in processing database queries is shown in FIG. 1. System 1000 can include database 100 hosted in computing environment 140 and user equipment (UE) devices 120A-120Z. Database 100 and UE devices 120A-120Z can be in communication with one another via network 190. Network 190 can be a physical network and/or a virtual network. A physical network can be, for example, a physical telecommunications network connecting numerous computing nodes for systems such as computer servers and computer clients. A virtual network can, for example, combine numerous physical networks or parts thereof into a logical virtual network. In another example, numerous virtual networks can be defined over a single physical network.

Database 100 can include a plurality of computing nodes arranged in a hierarchical order. Database 100 can include host node 110 and a plurality of child nodes provided by data nodes 112A-112Z. Host node 110 and respective ones of data nodes 112A-112Z can be provided by a physical computing node such as described by computing node 10 set forth herein. Each respective physical computing node can include one or more processor and an associated storage system. Each respective physical computing node defining host node 110 or a node of data nodes 112A-112Z can be external to each other respective physical computing node. A subset of data nodes 112A-112Z herein can be referred to as first through Nth data nodes. Database 110 can include link 1018 for providing communication between host node 110 and data nodes 112A-112Z. Link 1018 can include, e.g., a bus in accordance with any of a variety of bus architectures, and/or a Fibre Channel network.

Host node 110 can run various processes. Host node 110 can process user invoked data queries. Host node 110 processing a user invoked database query can include host node 110 running scanning process 116, planning process 117, and query execution process 118.

Host node 110 can include data repository 112 that can be physically located within storage system 114 of host node 110. Data repository 112 can include system tables 2101. System tables 2101 can record data describing an organization of database 100. Storage system 114 can be provided by a storage device, e.g. disk or solid state storage device (SSD) physically associated to and defining host node 110.

Respective data nodes 112A-112Z can include data repository 1112 that can be physically located within storage system 1114 of a respective data node. Data repository 1112 can include tables segments 2201. A data table of database 100 can be distributed amongst respective storage systems 1114 of data nodes 112A-112Z so that respective ones of storage systems 1114 have a segment (table segment) of the data table. A certain table of database 100 can have table segments thereof distributed amongst respective storage systems 1114 of data nodes 112A-112Z. Storage system 114 can be provided by a storage device, e.g. disk or solid state storage device (SSD), physically associated to and defining host node 110.

System tables 2101 of host node 110 can record data specifying, e.g., identifiers of data nodes of database 100, metrics data for data nodes of database 100, identifiers for data tables of database 100 distributed amongst storage systems 1114 of data nodes 112A-112Z, statistics data for data tables, and rules associated to various data tables. System tables 2101 in one aspect can store security rules associated to row secure tables (RSTs) distributed amongst storage systems 1114 of data nodes 112A-112Z. System tables 2101 can also include statistics system tables that record statistics respecting data tables of database 100, which data tables can be distributed amongst storage system 1114 of data nodes 112A-112Z.

Referring to data nodes 112A-112Z, each respective data node of data nodes 112A-112Z can include data repository 1112 having table segments 2201. Data repository 1112 can be physically stored in storage system 1114 which can be provided, e.g., by disk or solid state storage device (SSD). Storage system 1114 of each respective data node of data nodes 112A-112 can include extents. An extent herein can refer to the smallest unit of storage system allocation e.g. disk allocation. An extent, according to one embodiment, can include an allocation of J MB of disk space. Embodiments herein can provide features so that extents of storage system 1114 can be subject to exclusion from an IO data access function performed as part of processing of a database query.

In database 100, data tables can be distributed between respective data nodes 112A-112Z. There can be Z number of data nodes 112A-112Z, e.g. Z=4, Z=24, Z=48, Z=96, and the like. Tens to thousands or more data tables, each with tens to billions or more rows, can be distributed between respective data nodes 112A-112Z. Referring to data repository 1112 of data nodes 112A-112Z, each respective data node of data nodes 112A-112Z can include a segment of respective tables distributed between data nodes 112A-112Z.

For example, in a scenario where there are Z=24 data nodes 112A-112Z, a first data table with 24,000 rows can be distributed amongst data nodes 112A-112Z so that the first 1000 rows (table segment A) are distributed into data node 112A, the second 1000 rows (table segment B) are distributed into data node 112B, and the last 1000 rows (table segment Z) are distributed into data node 112Z. Each data node of data nodes 112A-112Z can have a dedicated one or more processor and storage system. According to an advantage of the architecture described, respective processors of the respective data nodes 112A-112Z can process in parallel to act on different segments of a common data table simultaneously.

The described architecture of database 100 provides for fast processing of a database query. For example, by respective data tables of database 100 having been split up into the described plurality of data nodes 112A-112Z and particularly into storage systems 1114 thereof, processes on a given table can be performed in parallel. With parallel processing, distributed segments of a data table distributed between data nodes can be processed simultaneously. One type of data table that can be distributed and stored amongst storage systems of data nodes 112A-112Z is a row secure table (RST). An RST refers to a table in which different users can have different access privileges.

In an RST, first users can have access privileges to first rows of an RST and second users can have access privileges to second rows of the RST. An RST can have associated security rules that can be stored in system tables 2101. Security rules can determine access privileges to rows of an RST. RST security rules can range in complexity and can be simple to complex. A row security rule can specify, e.g., that a certain security tag (determining users who can access the row) applies to a row when a column value of the row is within a specified range. Embodiments herein can include a particularly configured RST having a security column tag that facilitates collection of enhanced zone data that specify information on content on respective storage system extents of data nodes 112A-112Z. Host node 110 examining the zone data can identify extents of a data node storage system that can be excluded from data access operations performed in the course of query processing.

With further reference to data repository 112 of respective data nodes 112A-112Z, data repository 112 in zone data area 2202 can store zone data. Zone data area 2202 can store zone data objects that specify minimum and maximum (min-max) data values within respective extents associated to a storage system 1114 of a respective data node.

Referring to FIG. 1, zone data area 2202 of data repository 1112 of data node 112A can include zone data objects, e.g. tables, e.g. Tables B and D herein that specify for respective table segments stored within storage system 1114 of data node 112A min-max data values associated to the respective extents EXA1, EXA2, and EXAN associated to storage system 1114 of data node 112A. Zone data area 2202 of data repository 1112 of data node 112B can include zone data objects, e.g. tables, that specify for respective table segments stored within storage system 1114 of data node 112B min-max data values associated to the respective extents EXB1, EXB2, and EXBN associated to storage system 1114 of data node 112A. Zone data area 2202 of data repository 1112 of data node 112Z can include zone data objects, e.g. tables, that specify for respective table segments stored within storage system 1114 of data node 112Z min-max data values associated to the respective extents EXZ1, EXZ2, and EXZN associated to storage system 1114 of data node 112Z.

Data node 112A running zone data process 1116 can examine table segment data stored in storage system 1114 of a respective data node to extract statistical data thereof. The statistical data can be in the form of the described zone data objects, e.g. zone data tables which specify for the respective extents of storage system 1114 of data node 112A, minimum (min) and maximum (max) table values. Data nodes 112B-112Z can also run their respective instances of zone data process 1116 for generating zone data of their respective storage system extents.

Host node 110 running scanning process 116 can include host node 110 in response to ascertaining a user invoked database query scanning of data nodes 112A-112Z for optimization of processing of the user invoked database query. Host node 110 running scanning process 116 can include host node 110 scanning collected zone data stored on respective data nodes 112A-112Z as set forth herein respective as well as table data stored within extents of storage systems 1114 of data nodes 112A-112Z. Host node 110 running scanning process 116 can include host node 110 examining zone data of respective data nodes 112A-112Z for providing an ordered list of tables ranked by table size for use in processing of a query.

Host node 110 running planning process 117 can include host node 110 examining returned scan data resulting from running of scanning process 116 to output an execution plan for executing a database query. Host node 110 running planning process 117 can comprise using scanned zone data to identify extents within respective storage systems 1114 of data nodes 112A-112Z that can be excluded from TO data access operations during scanning and during query execution. Query processing speed can be improved by identifying extents that can be excluded and excluding such extents from TO data access operations during database query processing.

Host node 110 by running scanning process 116, planning process 117, and query execution process 118 can use the zone data of zone data area 2202 of respective data nodes 112A-112Z for improving and optimizing processing including execution of a database query invoked by a user and/or process interface.

Embodiments herein recognize that latencies associated with a JOIN process for joining tables can be reduced by establishing an ordering of tables for joining so that a smaller table for joining precedes a larger table for joining. According to one scenario, host node 110 running planning process 117 can include host node 110 providing an ordered list of tables ranked by table size for use in execution of a database query. In providing the ordered list of table sizes, host node 110 can use an adjusted table size for at least one table to be joined. The at least one table can be provided by an RST. Host node 110 can provide an adjusted table size using information on excluded extents from a user. That is, where a table has been subject to extent exclusion, an adjusted table size for the table, adjusted in dependence on extents excluded, can be used. According to one embodiment, table size herein can be defined by (and expressed in terms of) number of rows of a table (table row size). According to one embodiment, an adjusted table size herein can be provided as the raw (unadjusted) table row size defined by the number of rows of a table, minus the number of rows excluded with the identified excludible extents. Host node 110 running planning process 117 can include host node 110 using an ordered list of table sizes provided using at least one adjusted table size for performance of a JOIN process.

Host node 110 running query execution process 118 can include host node 110 executing the query execution plan resulting from running of planning process 117. In one scenario, host node 110 running query execution process 118 can comprise host node 110 excluding extents of one or more table and joining tables which have been ordered using one or more adjusted table size.

Host node 110 running services process 119 can include host node 110 processing received user defined data to identify data queries invoked by the user defined data. Host node 110 running services process 119 can provide features that adapt database 100 for a particular service which can be e.g. a scheduling service, a subscription service, an entertainment service, a manufacturing support service, or the like. Application process 119, in one embodiment, can provide a particularly designed user interface configured for (a) receipt of user defined data from which a user invoked query can be identified, as well as (b) output of data from database 100 to a user. In addition to or in place of receiving query invoking user defined data from UE devices 120A-120Z, database 100 can receive query invoking process defined data from process interface PI 122, e.g. an automated process as shown in FIG. 1. Database queries herein can include user invoked and/or process invoked queries. Application process 119 accordingly in one embodiment can provide a particularly designed PI 122 configured for (a) receipt of process defined data from which a process invoked query can be identified, as well as (b) output of data from database 100 to the process.

Respective data nodes 112A-112Z can further perform execute process 1117. Data node 112A performing execute process 1117 can perform functions with respect to storage system 1114 for execution of a database query in accordance with an execution plan returned by host node 110 performing planning process 117. Data nodes 112B-112Z can also run their respective instances of zone execute process 1117 for execution of a database query in accordance with an execution plan.

Figure 2:
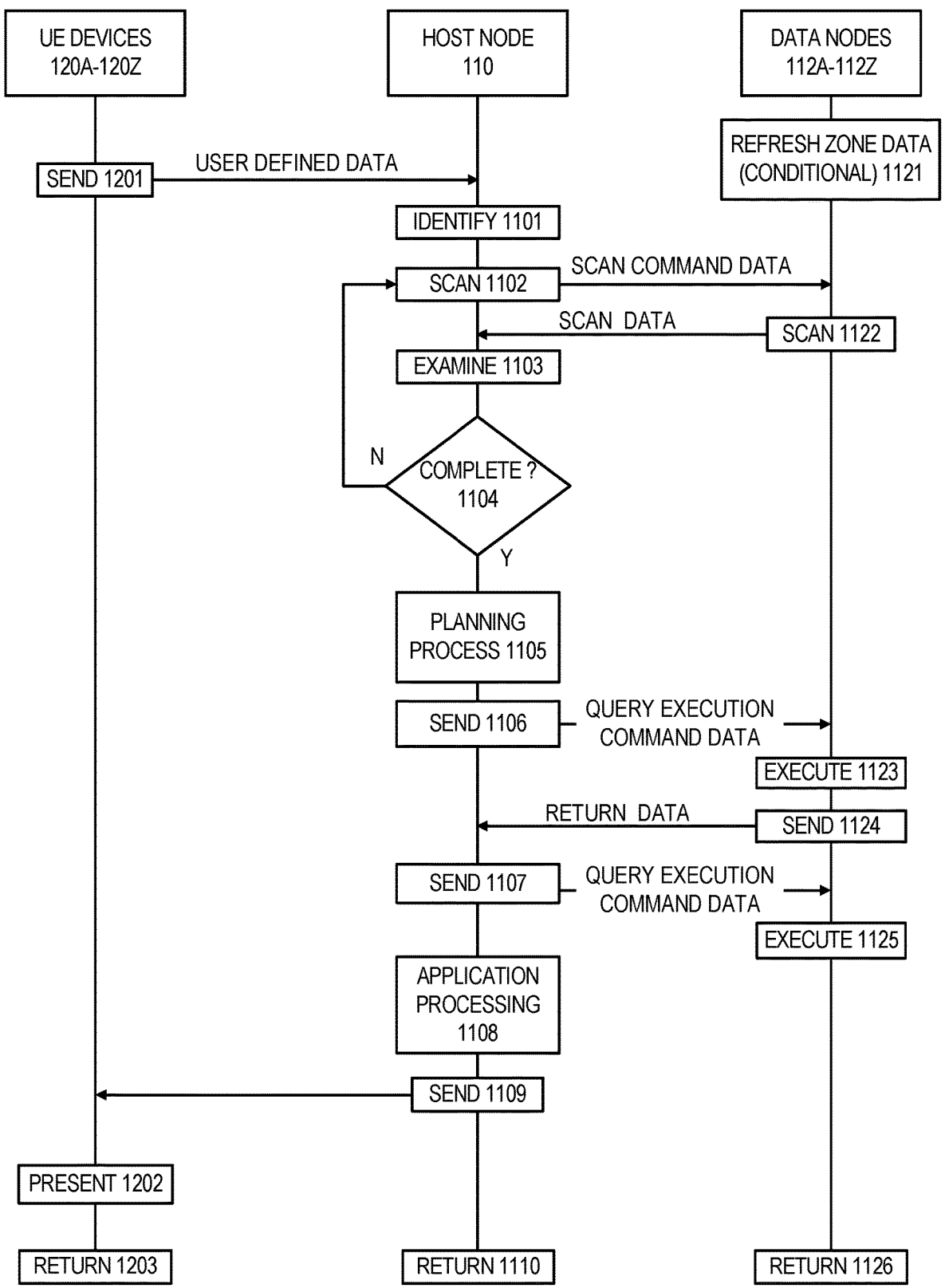
FIG. 2 is a flowchart illustrating a method for performance by a database host node interoperating with other components according to one embodiment.

A method for performance by host node 110 interoperating with data nodes 112A-112Z and UE devices 120A-120Z is set forth in reference to the flow chart of FIG. 2.

At block 1121, one or more data node of data nodes 112A-112Z can be refreshing zone data. According to one embodiment, the refreshing zone data at block 1121 can be conditional on table data of a respective node having been modified, e.g. in response to a just executed database query. Data nodes 112A-112Z can be configured to refresh their respective zone data in response to performance of a LOAD, INSERT, or UPDATE, GROOM operation on the storage system of a respective data node. The refreshing can be performed in the background so that a most recent refresh has been completed at a time that a new database query has been identified, and thus will not increase latency associated to processing of the new database query.

System 1000, according to one embodiment, can be configured so that when a respective data node, e.g., data node 112A, updates table data thereof in storage system 1114, the respective data node of data nodes 112A-112Z responsively runs zone data process 1116 to update zone data so that zone data area 2202 of data repository 1112 of data node 112A is updated and contains updated data that can be subsequently scanned by scanning process 116 of host node 110.

Updating of zone data by data nodes 112A-112Z such as by data node 112A, according to one embodiment, is described in further reference to Tables A-D herein below. Referring to Table A, Table A depicts a segment of a first table A001 stored within storage system 1114 of data node 112A, together with the extent association of various rows of the table segment of the first table A001.

TABLE A

Trade Table (first table A001)

| EXTENT | DATE | CUST_ID | SYMBOL | ... |
|--------|------|---------|--------|-----|
| EXA1 | 01 | 205 | NZX | ... |
| EXA1 | 01 | 100 | IBX | ... |
| EXA1 | 01 | 400 | NZX | ... |
| EXA2 | 01 | 100 | NCX | ... |
| EXA2 | 02 | 700 | SUNX | ... |
| EXA2 | 02 | 100 | LTXX | ... |
| EXA2 | 02 | 300 | NZX | ... |
| EXA2 | 03 | 210 | IBX | ... |
| EXAN | 03 | 850 | ANXX | ... |
| EXAN | 03 | 205 | BPX | ... |
| EXAN | 03 | 700 | NZX | ... |
| ... | ... | ... | ... | ... |

Referring to Table A, the first three rows of the depicted table segment of first table A001 can be stored within extent EXA1 of storage system 1114 of data node 112A. The fourth through eighth rows of first table A001 can be stored within extent EXA2 of storage system 1114 of data node 112A and the ninth through twelfth depicted rows of first table A001 can be stored within extent EXAN of storage system 1114 of data node 112A. Additional rows (not shown) of Table A can reference extents EXB1-EXBZ of data nodes 112A-112Z.

Referring to Table B, Table B illustrates extraction of statistical zone data from the table segment data of Table A by way of running of zone data process 1116 of data node 112A and data nodes 112B-112Z.

TABLE B (Zone Data)

| EXTENT | Date Min | Date Max | Cust_ID Min | Cust_ID Max | Starting Address | Ending Address |
|--------|----------|----------|-------------|-------------|------------------|----------------|
| EXA1 | 01 | 01 | 100 | 400 | XX | XX |
| EXA2 | 01 | 03 | 100 | 700 | XX | XX |
| EXAN | 03 | 03 | 205 | 850 | XX | XX |

Referring to Table B, data node 112A running zone data process 1116 can extract min-max data values for various columns of the table segment stored on storage system 1114 of data node 112A. The zone data of Table B can be stored within zone data area 2202 of data node 112A. Based on data node 112A running zone data process 1116, the statistical data of zone data specified in Table B can be extracted.

Referring to the Table B zone data, the extent EXA1 can have a date min of 01, a data max of 01, and a customer ID min-max range of from 100 to 400. The extent EXA2 can have a date min-max range of from 01 to 03 and a customer identifier min-max range of from 100 to 700. The extent EXAN can have a date min-max range of 03-03, a customer ID min-max range from 205 to 850. In a manner set forth herein, host node 110 running scanning process 116 of planning process 117 can use the zone data extracted as shown in Table B for return of an execution plan for executing a database query.

Embodiment herein recognize that current databases do not optimally process row secure tables (RSTs). An RST can refer to a database table with security labels on rows to filter out users without appropriate privileges.

Table C depicts a segment of a row secure table (RST) configured in support of higher speed database query processing. An RST herein can refer to a table having security tags on rows used for filtering of data (rows based on user privileges). Referring to Table C, a security tag provided by a security level is specified in a security level column.

TABLE C (Security Tag Table A002)

| EXTENT | CUST_ID | Security Level | Secret Data | ... |
|--------|---------|----------------|-------------|-----|
| EXA1 | 305 | 02 | XX | ... |
| EXA1 | 210 | 02 | XX | ... |
| EXA1 | 350 | 02 | XX | ... |
| EXA2 | 405 | 03 | XX | ... |
| EXA2 | 205 | 02 | XX | ... |
| EXA2 | 205 | 02 | XX | ... |
| EXA2 | 405 | 03 | XX | ... |
| EXA2 | 760 | 03 | XX | ... |
| EXAN | 150 | 01 | XX | ... |
| EXAN | 210 | 02 | XX | ... |
| EXAN | 105 | 01 | XX | ... |
| ... | ... | ... | ... | ... |

According to one aspect, the security tag provided by security level value for each respective row of an RST is specified by an integer value. In Table C, the security level column includes an integer value that specifies a minimal security level of a user required for access to the data of the data row. The providing of the security level as an integer value facilitates further processing so that by data node 112A performing zone data process 1116, zone data process 1116 can identify min and max values from the security level column as shown in Table C. Embodiments herein recognize that providing an RST in accordance with the data structure illustrated in reference to Table C, reduced latencies in the processing of database queries can be achieved. With an RST provided as shown in Table C, data node 112A can run zone data process 1116 to extract extended zone data as depicted in Table D. Referring to Table D, the extracted zone data for storage system 1114 of data node 112A can include statistical data for the respective extents EXA1, EXA2, and EXAN of storage system 1114 of data node 112A.

TABLE D (Zone data for RST)

| EXTENT | Cust_ID Min | Cust_ID Max | SECURITY LEVEL Min | SECURITY LEVEL Max | Starting address | Ending Address |
|---|---|---|---|---|---|---|
| EXA1 | 100 | 350 | 02 | 02 | XX | XX |
| EXA2 | 205 | 760 | 02 | 03 | XX | XX |
| EXAN | 105 | 210 | 01 | 02 | XX | XX |

Referring to Table D, a depicted zone data table can specify attributes of storage of a table within reference to extents of a storage system. Referring to Table D, a depicted zone data table can specify that extent EXA1 includes a Cust_ID min-max range of 100-400 and a security level min-max range of 01-02. Further referring to Table D, extent EXA2 can have a Cust_ID min-max range of 205-300 and a security level min-max range of 02-03. Further referring to the zone data of Table D, the extent EXAN can have a Cust_ID min-max range of 205-850 and a security level min-max range of 01-02. In a manner set forth more fully herein, host node 110 can use the zone data table specified in Table D by way of running scanning process 116 and planning process 117 in a manner to speed up processing of a database query.

Referring further to the flowchart of FIG. 2, a user of a UE device of UE devices 120A-120Z can invoke a database query at block 1201. At block 1201, a UE device of UE devices 120A-120Z can send user defined data to host node 110 where the user defined data invokes a database query. At block 1101, in response to receipt of the user defined data, host node 110 can identify an invoked database query. In response to the identification of a user invoked query at block 1101, host node 110 at scan block 1102 can activate scanning process 116 running on host node 110. Alternatively, at block 1201, a process interface in addition to or in place of a user using user interface can invoke a database query.

The described architecture of database 100 provides for fast processing of a database query. For example, by splitting up of respective data tables of database 100 into the described plurality of data nodes 112A-112Z and particularly into storage systems 1114 thereof, processes on various tables can be performed in parallel and simultaneously with respect to a given table by respective one or more processor of two or more data nodes of data nodes 112A-112Z to speed up query processing.

Host node 110 at scan block 1102 can run scanning process 116 to send scan command data to respective ones of data nodes 112A-112Z. Scan command data sent at block 1102 can include scan commands to examine zone data as set forth herein in connection with Table B and D and/or data of table segments 2201 of storage system 1114 of the various data nodes 112A-112Z.

The transformation of extracted raw underlying table data into zone data 2202 reduces processing time for performing of scanning. At block 1122, respective data nodes of data nodes 112A-112Z can send returned scan data to host node 110. In response to the receipt of the scan data sent at block 1122, host node 110 can perform examining of the returned scan data at block 1103. The examining of returned scan data at block 1103 can include examining to identify storage system extents of data nodes 112A-112Z that can be excluded from subsequent IO data access operations performed as part of processing execution of the database query identified at 1101. With the identifying of the database query at block 1101, host node 110 can examine the database query to identify one or more user associated to the query and one or more table associated to the query. Subsequent processing of the database query can be in dependence of the identified one or more user and the identified one or more table.

The examining of returned scan data at block 1103 can include examining to identify an ordering of tables ranked by size. There is set forth herein, according to one embodiment, scanning by a host node, zone data from first through Nth data nodes, wherein a first node of the first through Nth data nodes stores in a first storage system of the first node a first segment of a first table within a set of extents of the first data node, wherein a second node of the first through Nth data nodes stores in a second storage system of the second node a second segment of a first table within a set of extents of the second node; wherein a zone data process of the first data node generates first zone data that specifies minimum to maximum security level values of the first set of extents, wherein a zone data process of the second data node generates second zone data that specifies minimum to maximum security level values of the second set of extents; generating an execution plan, wherein the generating an execution plan includes identifying at least one excludible extent of the first set of extents stored in the first storage system using the first zone data, and identifying at least one excludible extent of the second set of extents stored in the second storage system using the second zone data; and executing a database query using the execution plan, wherein the executing comprises excluding from data access the identified at least one extent of the first set of extents and the identified at least one extent of the second set of extents.

Embodiment herein recognize that database query processing time can be substantially reduced where storage system extents that can be excluded from IO data access operations can be accurately identified. At examine block 1103, host node 110 using the returned scan data sent at block 1122 from data nodes of data nodes 112A-112Z can provide an ordered list of tables ranked by table size for use in execution of a database query.

Operations of host node 110 identifying extents that can be excluded from IO data access operations are described in reference to the following example. Suppose an identified database query includes a statement that indicates a security level of 03 for access. A user or process invoked database query can be invoked as follows: SELECT*FROM TableA002 WHERE security_level=03.

Host node 110 at examine block 1103 can examine the described database query in connection with return scan data sent at block 1122 in order to identify storage system extents of data nodes 112A-112Z that can be excluded from a subsequent IO data access operation for execution of the identified database query. Host node 110, in the described example where the identified database query includes a SELECT statement that references a security level data value of 03 and in view of the zone data described in reference to Table D, can determine that extent EXA1 having a range of 01-02 and extent EXAN having a range of 01-02 can be excluded from one or more subsequent IO data access operation, given that the data value of 03 is outside of the range 01-02, for the noted extents.

In another aspect, host node 110 can use zone data to exclude extents based on an identification of a user associated to an invoked database query. In some scenarios, an invoked database query can be associated to a user such as the user invoking the query, or a user referenced in a process invoked query. Where an invoked database query is associated to a user, host node 110 can use zone data as set forth in Table D to identify excludible extents to thereby increase query processing speed.

Figure 3:
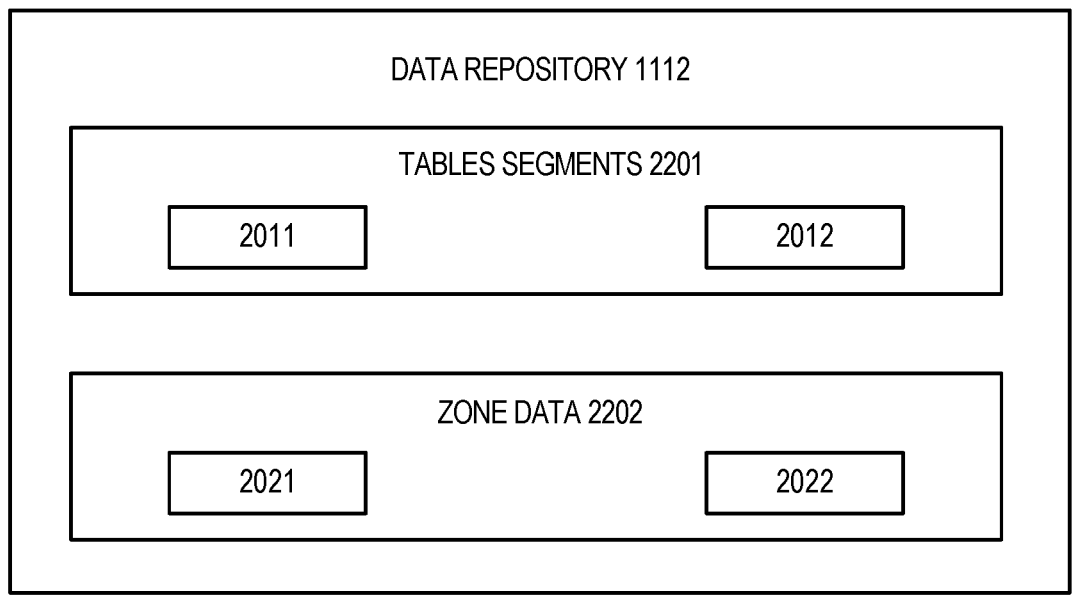
FIG. 3 depicts a data repository of a data node according to one embodiment.

Referring to FIG. 3, data repository 1112 of respective ones of data nodes can include, for a plurality of tables, table segments 2201. The table segments can be segments 2011 of general (non-RST) tables and segments 2012 of RSTs. Zone data area 2202 can include zone data 2021 for general (non-RST) tables and zone data 2022 for RSTs.

For determining extents to exclude based on a user, host node 110 can use the security association system tables as set forth in Table E to identify a security level of a user, and then can use the security level and zone data to exclude identified excludible extents of a storage system 1114.

TABLE E (User to Security Level mapping)

| USER_ID | Security level |
| --- | --- |
| U001 | 03 |
| U002 | 01 |
| U003 | 02 |

As referenced in the system table to Table F, the different security levels specified in Table E can map to different security level names.

TABLE F

| Security level | Security Level Name |
| --- | --- |
| 01 | PUBLIC |
| 02 | PRIVILEGED |
| 03 | ADMIN |

The security level 01 can map to "PUBLIC", the security level 02 can map to "PRIVILEGED", and the security level 03 can map to "ADMIN".

In one scenario, an incoming database query can be associated to a user. On identification of the query, host node 110 can identify a certain user, e.g., user U0002 associated to the query. Host node 110 can then use the security association system table of Table E to look up the security level of the user. In the described example the user can have a security level of security_level=01, which maps to "PUBLIC" (Table F). Host node 110, on determining that the security level of the user is security_level=01, can examine the zone data of Table D. On examining the zone data of Table D, host node can determine that the user does not have access privileges with respect to EXA1 and EXA2 and can identify EXA1 and EXA2 as excludible extents.

On performance of a first iteration of examining at block 1103, host node 110 can proceed to block 1104. At block 1104, host node 110 can determine whether scanning is complete. In one embodiment, host node 110 can determine that scanning is complete after scan data is extracted from zone data and from storage system extents. According to one scenario, host node 110, in an initial iteration of scanning at block 1102, can limit scanning to zone data scanning. On the determination that scanning is not complete at block 1104, host node 110 can return to scan block 1102 to continue scanning. In one example, host node 110 in a second iteration of scan block 1102 can perform scanning of storage system extents. The scanning of storage system extents in the second iteration of scanning can be limited to storage system extents that are not excluded from scanning by examination of zone data from the first iteration of scanning. Scanning of storage system extents can return such scan data as information on row distributions amongst extents, row size, value dispersals, unique values, min-max values, number of nulls and the like, all of which can be used by host node 110 for query execution plan generation. On receipt of the returned scan data, host node 110 can use the returned scan data for plan generation. In one aspect, host node 110 can use the returned scan data for providing a table size of a table to be subject to a JOIN clause, and can use the provided table size in establishing an ordering of tables for performance of a JOIN process.

The scanning of storage system extents at block 1102 can be performed in dependence on identified excludible extents identified at block 1103. Where a first element of a certain query results in identification of first extents for exclusion and a second element of the certain query results in identification of second extents for exclusion, host node 110 can identify the intersection of the first extents and the second extents for exclusion in a subsequent scan process at block 1102. For example, by a first statement or clause of query extents EXA1 and EXAN can be identified for exclusion. By a second statement or clause of a query, extents EXA1 and EXA2 can be identified for exclusion. In the described example, the intersecting extent EXA1 (common to both elements) can be subject to exclusion in a subsequent storage system extent scan at block 1102. In subsequently executing the query, the identified extents for exclusion for each statement or clause of a query can be excluded when functions associated to the element can be excluded. That is, if host node 110 has identified first excludible extents associated to SELECT statement and second excludible extents associated to a JOIN clause, host node 110 can exclude the first excludible extents on execution of the SELECT statement and can exclude the second excludible extents on execution of the JOIN clause.

There is set forth herein, according to one embodiment, scanning by a host node, zone data from first through Nth data nodes, wherein a first node of the first through Nth data nodes stores in a first storage system of the first node a first segment of a first table within a set of extents of the first data node, wherein a second node of the first through Nth data nodes stores in a second storage system of the second node a second segment of a first table within a set of extents of the second node; wherein a zone data process 1116 of the first data node generates first zone data that specifies minimum to maximum security level values of the first set of extents, wherein a zone data process 1116 of the second data node generates second zone data that specifies minimum to maximum security level values of the second set of extents; generating an execution plan by running of planning process 117, wherein the generating an execution plan includes identifying at least one excludible extent of the first set of extents stored in the first storage system using the first zone data, and identifying at least one excludible extent of the second set of extents stored in the second storage system using the second zone data; and executing a database query using the execution plan, wherein the executing comprises excluding from data access the identified at least one extent of the first set of extents and the identified at least one extent of the second set of extents.

There is set forth herein, according to one embodiment, examining an invoked database query, e.g., as identified at block 1101 for execution on a database; scanning zone data from at least one data node of the database in dependence on the examining, e.g., as set forth in connection with block 1102, the at least one data node of the database having a storage system 1114 and storing in the storage system 1114 table data of a table, wherein security tags, e.g., as explained with reference to Table C, are associated to respective rows of the table, and wherein the zone data, e.g. as explained with reference to Table D, specifies attributes of storage of the table within respective storage system extents of the storage system; identifying, using the zone data, at least one excludible extent of the storage system extents; and excluding the at least one excludible extent from an IO data access operation in processing of the invoked database query.

Host node 110 can iteratively perform the loop of blocks 1101-1104 until host node 110 at block 1104 determines that scanning has completed. In response to the determining that scanning has completed, host node 110 can proceed to planning process block 1105.

At block 1105, host node 110 running planning process 117 (FIG. 1) can determine and specify a returned execution plan for executing the identified database query identified at block 1101. A returned execution plan can use identified excludible extents identified at examine block 1103. Thus, at planning process block 1105, host node 110 can specify a database query execution plan that specifies exclusion of extent EXA1 and extent EXAN of storage system 1114 of data node 112A (for a SELECT process) and exclusion of extents EXA1 and EXA2 (for a JOIN process) in the described scenario. The exclusion of the identified extents in IO data access operations speeds up performance of database 100.

According to one scenario, an identified database query identified at block 1101 can be a database query specifying a JOIN clause. For performance of a JOIN database clause, host node 110 can perform the JOIN clause so that a smaller table for purposes of performing the JOIN clause is specified as the first table in the join operation and a second relatively larger table for purposes of the JOIN clause is specified as a second table. Database 100, in one embodiment, can use a cost based optimized (CBO) planner.

EXAMPLE

For improvement of database performance, smallest tables can be placed at the beginning for a JOIN process and largest on the end of a JOIN process. In some systems, a database engine can join only two tables in one JOIN process and the next JOIN would be performed on the result set of the data (from the first join) and the next table. For many SQL queries, the database engine has freedom of sequence in a JOIN process. A database can provide candidate plans and select the plan where the amount of processed data will be smaller.

Consider the following tables: t1 with 100 000 000 rows, t2 with 1 000 rows, t3 with 10 rows and the following select: select * from t1, t2, t3 where t1.a=t2.b and t2.c=t3.d. For select as above, the database engine can join: (1) t1 with t2 and then t3 (this is the plan 1) or (2) t2 with t3 and then t1 (this is the plan 2) so for (plan 1), there can be processed the first join: t1 with t2→(100 000 000*1000)/join_rate (usually assumed as 10)=10 000 000 000 and then the second join with t3 (10 000 000 000 (from the first join)*10)/join rate (usually assumed as 10)=10 000 000 000. Accordingly, in total, there is 20 000 000 000 operation for plan 1. For (plan 2) there can be processed the first join t2 with t3→(1 000*10)/join_rate (usually assumed as 10)=1 000 the second join with t1→(1 000 (from the first join)*1 000 000 000)/join_rate (usually assumed as 10)=10 000 000 000. Accordingly, there are 10 000 001 000 operations for plan 2.

If the database engine 'knows' the accurate number of the rows in the table, it can choose the plan with a smaller number of operations (here plan 2). The row access data for different users defines adjusted table size data. The adjusted table size data can be provided so that from the perspective of different users, a table can have different sizes. Embodiment herein can use the described adjusted table size in providing an ordering of tables from smallest to largest for optimization of a JOIN clause.

End of Example

Embodiments herein recognize that for optimization of a JOIN process, first and second tables can be ordered in an order from smaller table to larger table. In the described scenario, host node 110 for determining a table order according to size for performance of a JOIN operation, can provide an adjusted table size based on extents identified for exclusion in a database query IO data access operation. According to one embodiment, host node 110 can determine an adjusted table size for purposes of a JOIN operation as the raw (unadjusted) table row size minus a number of rows associated to extents identified for exclusion as set forth herein. As described herein, host node 110 at examine block 1103 can identify extents such as extent EXA1 and EXAN or EXA1 and EXA2 for exclusion using zone data as described in connection with Table D. Embodiments herein recognize that certain tables can have differentiated table sizes based on the perspective of a user. An RST can have a first table row size from the perspective of a first user and a second table row size from the perspective of a second user. Embodiments herein can feature a process for determining an adjusted table size for an RST that specifies a number of rows for different users. Embodiments herein recognize that latencies can be reduced in the performance of a JOIN clause by ordering of tables to be joined from smaller size to larger size. In a further aspect herein, host node 110 in performing a JOIN process involving an RST can ascertain an adjusted table size of the RST. Embodiments herein can speed the performance of database 100 by use of data indicating access privileges of an RST. Embodiments herein recognize that speed of a JOIN process of a database query can be increased by establishing an order for a JOIN clause of a database query so that a smaller table referenced in a JOIN clause precedes a larger table referenced in the JOIN clause. Embodiments further herein can use an adjusted table size of an RST for determining a JOIN clause order based on table size wherein the adjusted table size is in dependence on user access privileges in an RST. Embodiments herein recognize that establishing an order for a JOIN clause based on a raw (unadjusted, actual) table row size can slow performance of database 100.

Figure 4:
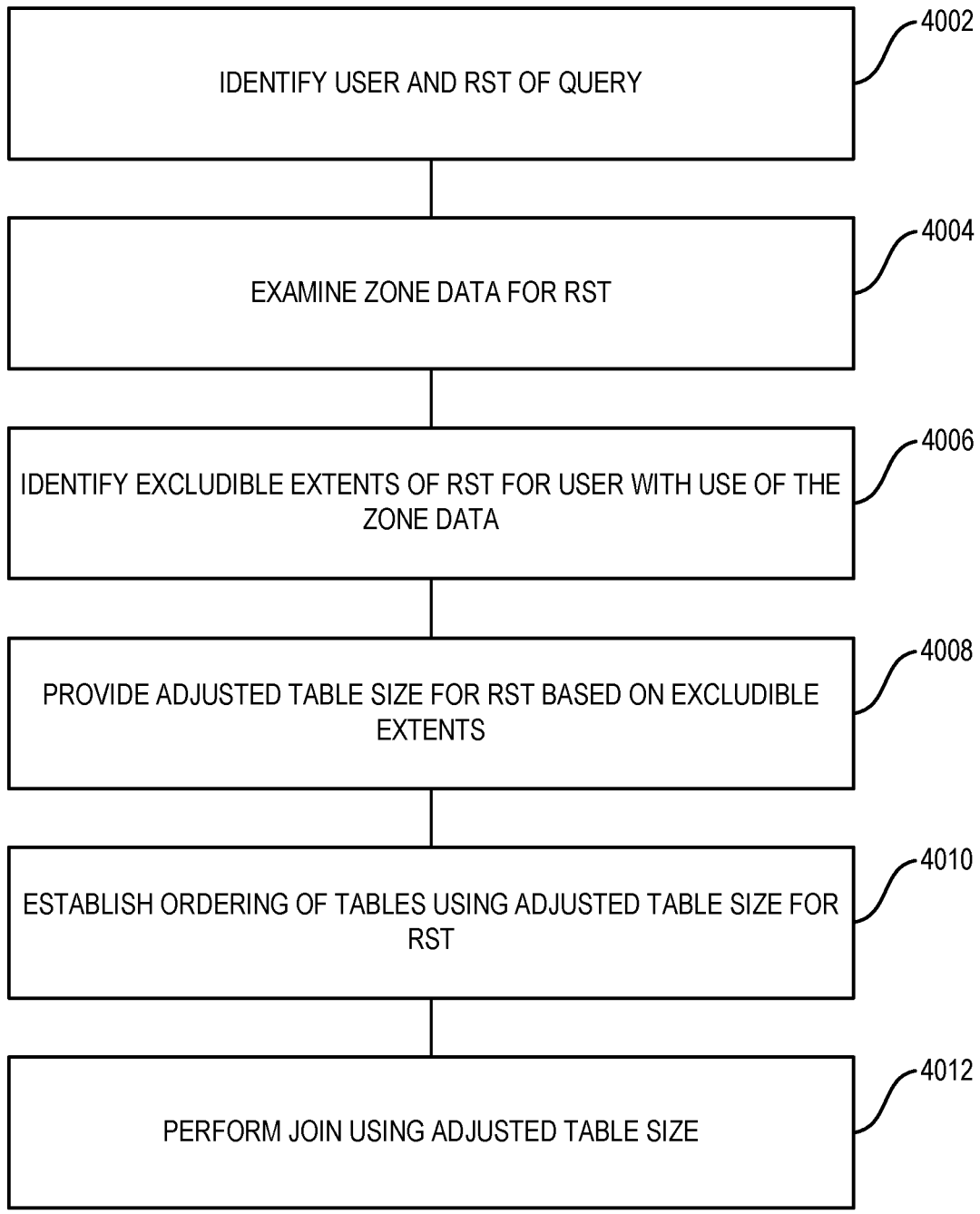
FIG. 4 is a flowchart illustrating a method for performance by a database host node interoperating with other components according to one embodiment.

For processing of a database query, host node 110 can perform the method as set forth in FIG. 4. At block 4002, host node 110 can examine a database query to identify within the database query identified at block 1101 a user associated to the query and an RST of the query. The associated user can include, e.g., the user sending the user defined data at block 1201 or a user referenced in a process invoked query. The identified RST can be an RST referenced in a JOIN clause of the database query. Host node 110 can look up zone data for the identified RST within zone data area 2202 of the relevant data node of data nodes 112A-112Z. At block 4004, host node 110 can examine zone data for the identified RST of block 4002, e.g., zone data as described in Table 4. At block 4006, host node 110 can identify excludible extents of the identified RST for the identified user with use of the zone data examined at block 4004. At block 4008, host node 110 can provide an adjustable table size for the RST based on and in dependence on the excludible extents identified at block 4006. At block 4010, host node 110 can establish an ordering of tables using the adjusted table size for the identified RST provided in dependence on excludible extents at block 4008. At block 4012, host node 110 can perform a JOIN process involving the identified RST using the adjusted table size provided at block 4008.

There is set forth herein, according to one embodiment, identifying an invoked database query for execution on a database, the invoked database query being associated to a user; establishing an execution plan for executing the database query on the database; wherein the establishing the execution plan for execution of the database query on the database includes establishing an ordering of first and second tables, the ordering of the first and second tables being in dependence on access privilege data of the user in respect to the first table; and executing the database query according to the execution plan.

The zone data, as described in connection with Table D, can include zone data that specifies min-max values for user security levels. Host node 110 providing a table order number at examine block 1103 can include host node 110 using zone data as described in connection with Table D herein that specifies min-max values for user security levels.

Referring again to planning process block 1105, host node 110 at planning process block 1105 can use a table order identified at block 1103 in return of an execution plan for performance of a database query. That is, host node 110 at planning process block 1105 can specify a table order for performance of a JOIN operation that uses zone data as described in connection with Table D which zone data can include min-max security level values.

In response to completion of planning block 1105, host node 110 can proceed to block 1106. At block 1106, host node 110 can initiate an execution of a database query in response to return of an execution plan at block 1105. For initiating execution of a database query, host node 110 at block 1106 can send query execution command data to data nodes of data nodes 112A-112Z. In response to receipt of the query execution command data, various ones of data nodes 112A-112Z can execute the query command data at execute block 1123. At block 1124, various ones of data nodes of data nodes 112A-112Z can send return data to host node 110.

For example, in a JOIN process, content of first and second tables can be sent by data nodes of data nodes 112A-112Z to host node 110 for processing by host node 110. At send block 1107, host node 110 can send further query execution command data to various ones of data nodes 112A-112Z and the various ones of data nodes can execute the further query execution command data sent at execute block 1125 to complete the execution of the identified data query. For example, where a JOIN process results in a new table that is stored as a new data table, the new table can be distributed into storage systems 1114 of data nodes 112A-112Z by performance of execute block 1124. In some scenarios, performance of execute block 1125 can trigger performance of refresh zone data block 1121.

In response to completion of send block 1107, host node 110 can proceed to application processing block 1108. At application processing block 1108, host node 110 can process returned database data returned from database 100 into a form according to requirements of particular application in support of a service, e.g. as part of a subscription service, financial services service, social media service, and the like.

Host node 110, in response to completing application processing block 1108 can, at block 1109, send output data to the certain UE device sending user defined data at block 1201. In addition, or alternatively at block 1109, host node 110 can send output data to process interface, PI 122. In response to the receipt of the output data, the certain UE device of UE devices 120A-120Z can present at present block 1202 the output data, e.g., on a user interface (e.g., displayed or otherwise presented). Responsively to the presentment at block 1210 the certain UE device can proceed to return block 1203.

At return block 1203, the certain UE device can return to a stage preceding block 1201 to wait for additional user defined data to be defined by data entry. In response to send block 1109 by host node 110, host node 110 can proceed to return block 1110. At return block 1110, host node 110 can return to a stage proceeding block 1101 to wait for a next user and/or process invoked database query. Host node 110 can iteratively perform the loop of blocks 1101-110 during a deployment period of host node 110 and can identify invoked database queries from a plurality of users and/or processes iteratively. UE devices 120A-120Z associated with the respective users can iteratively perform the loop of blocks 1201-1203 during a deployment period of host node 110 and all processes capable of invoking database queries can iteratively perform the loop of blocks 1201-1203 during a deployment period of host node 110. In response to completion of execute block 1125 of data nodes of data nodes 112A-112Z, data nodes 112A-112Z can proceed to return block 1126. At return block 1126, data nodes 112A-112Z can return to a stage proceeding block 1121 to refresh zone data at block 1121.

As set forth herein, refresh zone data block 1121 can be performed by data nodes of data nodes 112A-112Z in response to data of storage system 1114 of a data node having been modified. Data nodes 112A-112Z can iteratively perform the loop of blocks 1121-1126 during a deployment period of host node 110.

Embodiments herein can speed processing of database queries with use of zone data extracted from storage system extents associated to various data nodes. According to one embodiment, a database can include a host node and a plurality of child nodes provided by data nodes. The data nodes can store in storage systems thereof segments of different tables. Table segments can be stored within extents of a data node storage system. Embodiments herein can include respective data nodes running an instance of a zone data process which extracts zone data from a storage system wherein the zone data can specify min-max values associated to user security levels. A host node external to the respective data nodes can examine the described data node generated zone data to identify storage system extents for exclusion during a subsequent IO data access operation for processing of a database query. A host node can further examine the described zone data for identifying a table order. The host node can use the described table order for processing of an identified database query.

Prior to executing a database query such as an SQL command, a database management process can calculate an execution plan. Such a plan can contain a sequence of IO data access operations, e.g. atomic operations such as reading, filtering, sorting, and grouping combined in a certain sequence order. A database management process for performance of a JOIN process can provide an ordering of tables ranked from smallest table to largest table. That order is key for performance: for a JOIN operation, the database should take the smallest objects at the beginning and add bigger on the end.

In one embodiment, database 100 can feature elements in common with commercially available hardware accelerated database, e.g. IBM® PureData™ System for Analytics (also known as a Netezza® system). IBM® PureData™ System for Analytics and Netezza® are trademarks of International Business Machines Corporation.

A row secure table (RST) can be provided as a table with security labels on rows used for filtering out data (rows) based on the user privileges. Consequently, two users, with different privileges, obtain a different set of rows for the same SQL query executed against the same RST in the same moment. Embodiments herein recognize that from the perspective of first and second users having different security privileges, an RST can have first and second table sizes, i.e., a first table size from the perspective of the first user, and a second table size from the perspective of a second user. It means that table size is different for users with different privileges.

Embodiments herein recognize that existing databases do not take into account different table sizes for a common table wherein a size differentiation is based on the perspective of the user. As a result, execution plans for current databases can specify IO data access operations on extents that do not include relevant data, and JOIN operations can be performed without optimal efficiency in a manner wherein a larger table from the perspective of a user can precede a smaller table in a JOIN operation.

Embodiments herein can (i) provide low-level statistics (called "zone data") by adding a field for each extent representing the RST tags; and (ii) provide ways of sampling (scanning) table content based on the new feature added into zone data.

Embodiments herein can include (a) providing security tags, (b) storing security tags in RSTs, (c) refreshing zone data, and (d) omitting excluded extents during sampling.

Regarding (a) providing security tags, an RST herein as shown in Table C can be originally encoded to include a security tag column as shown by the Security Level column of Table C. In one embodiment, database 100 can be configured so that the security tags as shown in Table C are automatically generated and refreshed at refresh zone data block 1121. For refreshing of security tags, a data node performing zone data process 1116 can include a data node, e.g., data node 112A requesting and pulling security rules from system tables 2101. The data node can responsively apply the security rules to the RST to generate and refresh security tags. Security rules can determine access privileges to rows of an RST. RST security rules can range in complexity and can be simple to complex. A row security rule can specify, e.g., that a certain security tag (determining users who can access the row) applies to a row when a column value of the row is within a specified range. For each respective RST of data nodes 112A-112Z, for each row, the security tags can be calculated as an additional key value: F(<security-tag>)→<int-value>.

Regarding (b) storing security tags in RSTs, security tags can be encoded in a dedicated RST column as shown in Table C. In one embodiment, an RST can be calculated as a mnemonic text based value and converted into an integer value via table lookup using a security association table of system tables 2101. Providing the security tags as an integer value can facilitate processing of the RST for generation of zone data which specifies min max values of security tags which can be provided as security levels.

Regarding (c) refreshing zone data, a data node, e.g., data node 112A running zone data process can iteratively refresh zone data. For refreshing zone data, a data node can examine an appropriately encoded RST, as shown in Table C, to provide zone data as depicted in Table D with the zone data defined by security tag min max values.

Regarding (d) omitting excluded extents, host node 110 can generate an execution plan for a query wherein host node 110 can identify storage system extents for exclusion. Host node 110 can exclude identified excludible extents from IO data access operations when performing of scanning of storage system extents for generation of an execution plan. Host node 110 can exclude identified excludible extents from IO data access operations subsequent to determination of an execution plan when executing a database query according to an execution plan.

An example of performance of (a)-(d) is set forth in reference to Table E.

TABLE E

1) For each RST table, for each row, the security tags have to be calculated as an additional key value: F (<security-tag>)-><int-value>
Example:
For the security model Multi-Level Security (used in Netezza), for security tag Level, which represents the user Level for reading the row, the calculation value can be just its value
For Level defined in the database:
PUBLIC 0
CONF 10
SECURE 1000
f(PUBLIC) = 0
f(CONF) = 10
2) value calculated in (1) has to be stored in dedicated hidden columns (one column for a different security tag) for each row during writing.
3) for each data extend the minimal value from values stored in (2) are added into zone maps (it represents the minimal level of the privileges needed to read data from that extent)
4) determine the max current user privileges
Example: the user has Level CONF tagged:
f(CONF) = 1
4) during sampling omit the extends with have values not readable by the user. Example
Extend 1
Zone map Level 0
Extend 2
Zone map Level 10
Extend 3
Zone map Level 1000
User have Level CONF, f(CONF) = 10
Extend 3 is omitted.

There is set forth herein, according to one embodiment, scanning by a host node, zone data from first through Nth data nodes, wherein a first node of the first through Nth data nodes stores in a first storage system of the first node a first segment of a first table within a set of extents of the first data node, wherein a second node of the first through Nth data nodes stores in a second storage system of the second node a second segment of a first table within a set of extents of the second node; wherein a zone data process of the first data node generates first zone data that specifies minimum to maximum security level values of the first set of extents, wherein a zone data process of the second data node generates second zone data that specifies minimum to maximum security level values of the second set of extents; generating an execution plan, wherein the generating an execution plan includes identifying at least one excludible extent of the first set of extents stored in the first storage system using the first zone data, and identifying at least one excludible extent of the second set of extents stored in the second storage system using the second zone data; and executing a database query using the execution plan, wherein the executing comprises excluding from data access the identified at least one extent of the first set of extents and the identified at least one extent of the second set of extents.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computer implemented method also includes examining an invoked database query for execution on a database; scanning zone data from at least one data node of the database in dependence on the examining, the at least one data node of the database having a storage system and storing in the storage system table data of a table, where security tags are associated to respective rows of the table, and where the zone data specifies attributes of storage of the table within respective storage system extents of the storage system; identifying, using the zone data, at least one excludible extent of the storage system extents; and excluding the at least one excludible extent from an IO data access operation in processing of the invoked database query. Other embodiments of this aspect include corresponding computer systems, apparatus, and computer programs recorded on one or more computer storage devices, each configured to perform the actions of the methods.

Implementations may include one or more of the following features. The computer implemented method where the scanning zone data from at least one data node of a database includes scanning, by a host node, zone data from first through Nth data nodes, where a first node of the first through Nth data nodes stores in a first storage system of the first node a first segment of a first table within a set of extents of the first data node defined by the respective storage system extents of the storage system. A zone data process running on the at least one data node generates first zone data defining the zone data, the first zone data specifying minimum to maximum security level values of a set of extents defined by the respective storage system extents of the storage system. The at least one data node of a database includes a first data node and a second data node, where a zone data process of a first data node generates first zone data that specifies minimum to maximum security level values of a set of extents of the first data node defined by the respective storage system extents of the storage system, where a zone data process of the second data node generates second zone data that specifies minimum to maximum security level values of a second set of extents of the second data node defined by respective storage system extents of the storage system of a second storage system of the second data node. A zone data process running on the at least one data node generates the zone data, the zone data specifying minimum to maximum security level values of a set of extents defined by the respective storage system extents of the storage system, where the method includes generating an execution plan, where the generating an execution plan includes identifying at least one excludible extent of the set of extents stored in the storage system using the zone data. A zone data process running on the at least one data node generates the zone data, the zone data specifying minimum to maximum security level values of a set of extents defined by the respective storage system extents of the storage system, where the method includes generating an execution plan, where the generating an execution plan includes identifying at least one excludible extent of the set of extents stored in the storage system using the zone data, where the method includes executing the database query using the execution plan, where the executing the database query may include excluding from IO data access the identified at least one extent of the set of extents. The scanning zone data from at least one data node of a database includes scanning, by a host node, zone data from first through Nth data nodes, where a first node of the first through Nth data nodes stores in the storage system of the first data node a first segment of a first table within the set of extents of the first data node defined by the respective storage system extents of the storage system, where a zone data process of the first data node generates the zone data that specifies minimum to maximum security level values of the set of extents, where the method includes generating an execution plan, where the generating an execution plan includes identifying at least one excludible extent of the set of extents stored in the storage system using the zone data, where the executing may include excluding from data access the identified at least one extent of the set of extents. The table is a row secure table (RST) distributed between a first data node and a second data node of the at least one data node, the RST having security level column that specifies for respective rows of the RST a security level to define the security tag. The method includes generating an execution plan for executing the database query, where the generating includes ascertaining a user associated to the database query, and providing an adjusted table size for the table, the adjusted table size being adjusted in dependence on the at least one excludible extent, where the processing the database query may include executing the database query using the adjusted table size for the table. The method includes generating an execution plan for executing the database query, where the database query may include a join clause, where the generating includes ascertaining a user associated to the database query, and providing an adjusted table size for the table, the adjusted table size being adjusted in dependence on the at least one excludible extent, where generating the execution plan includes establishing an order of tables to be joined by execution of the join clause, where the establishing the order of tables to be joined includes using the adjusted table size for the table. The method includes generating an execution plan for executing the database query, where the database query may include a join clause, where the generating includes ascertaining a user associated to the database query, and providing an adjusted table size for the table, the adjusted table size being adjusted in dependence on the at least one excludible extent, and where the at least one excludible extent is excluded in dependence of the ascertaining of the user, where generating the execution plan includes establishing an order of tables to be joined by execution of the join clause, where the establishing the order of tables to be joined includes using the adjusted table size for the table. The scanning zone data from at least one data node of a database includes scanning, by a host node, zone data from first through Nth data nodes, where a first node of the first through Nth data nodes stores in a first storage system of the first node a first segment of a first table within a set of extents of the first data node defined by the respective storage system extents of the storage system, where a second node of the first through Nth data nodes stores in a second storage system of the second node a second segment of a first table within a second set of extents of the second node defined by the respective storage system extents of the storage system; where a zone data process of the first data node generates the zone data that specifies minimum to maximum security level values of the set of extents, where a zone data process of the second data node generates second zone data that specifies minimum to maximum security level values of the second set of extents; where the method includes generating an execution plan, where the generating an execution plan includes identifying at least one excludible extent of the set of extents stored in the first storage system using the first zone data, and identifying at least one excludible extent of the second set of extents stored in the second storage system using the second zone data; and executing the database query using the execution plan, where the executing may include excluding from IO data access the identified at least one extent of the set of extents and the identified at least one extent of the second set of extents. The scanning zone data from at least one data node of a database includes scanning, by a host node, zone data from first through Nth data nodes, where a first node of the first through Nth data nodes stores in the storage system of the first data node a first segment of a first table within a set of extents of the first data node defined by the respective storage system extents of the storage system, where a second node of the first through Nth data nodes stores in a second storage system of the second node a second segment of a first table within a second set of extents of the second node; where a zone data process of the first data node generates first zone data that specifies minimum to maximum security level values of the set of extents, where a zone data process of the second data node generates second zone data that specifies minimum to maximum security level values of the second set of extents; where the method includes generating an execution plan, where the generating an execution plan includes identifying at least one excludible extent of the set of extents stored in the storage system using the zone data, and identifying at least one excludible extent of the second set of extents stored in the second storage system using the second zone data; and executing the database query using the execution plan, where the executing may include excluding from IO data access the identified at least one extent of the set of extents and the identified at least one extent of the second set of extents, where the database query may include a join clause, where the generating includes ascertaining a user associated to the database query, and providing an adjusted table size for the table, the adjusted table size being adjusted in dependence on the identified at least one excludible extent and the ascertaining of the user, where generating the execution plan includes establishing an order of tables to be joined by execution of the join clause, where the establishing the order of tables to be joined includes using the adjusted table size for the table. The scanning zone data from at least one data node of a database includes scanning, by a host node, zone data from first through Nth data nodes, where a first node of the first through Nth data nodes stores in a the storage system of the first node a first segment of a first table within a set of extents of the first data node defined by the respective storage system extents of the storage system, where a second node of the first through Nth data nodes stores in a second storage system of the second node a second segment of the first table within a second set of extents of the second node; where a zone data process of the first data node generates first zone data that specifies minimum to maximum security level values of the set of extents, where a zone data process of the second data node generates second zone data that specifies minimum to maximum security level values of the second set of extents; where the method includes generating an execution plan, where the generating an execution plan includes identifying at least one excludible extent of the set of extents stored in the first storage system using the zone data, and identifying at least one excludible extent of the second set of extents stored in the second storage system using the second zone data; and executing the database query using the execution plan, where the executing may include excluding from data access the identified at least one extent of the set of extents and the identified at least one extent of the second set of extents, where the table is a row secure table (RST) distributed between the first data node and the second data node, the RST having security level column that specifies for respective rows of the RST a security level. The scanning zone data from at least one data node of a database includes scanning, by a host node, zone data from first through Nth data nodes, where a first node of the first through Nth data nodes stores in a first storage system of the first node a first segment of a first table within the set of extents of the first data node defined by the respective storage system extents of the storage system, where a zone data process of the first data node generates first zone data that specifies minimum to maximum security level values of the set of extents, where the method includes generating an execution plan, where the generating an execution plan includes identifying at least one excludible extent of the set of extents stored in the first storage system using the first zone data, where the executing may include excluding from data access the identified at least one extent of the set of extents, where the executing may include excluding from IO data access the identified at least one extent of the set of extents and the identified at least one extent of the second set of extents, where the table is a row secure table (RST) distributed between the first data node and the second data node, the RST having security level column that specifies for respective rows of the RST a security level, where the database query may include a join clause, where the generating includes ascertaining a user associated to the database query, and providing an adjusted table size for the table, the adjusted table size being adjusted in dependence on the identified at least one excludible extent and the ascertained user, where generating the execution plan includes establishing an order of tables to be joined by execution of the join clause, where the establishing the order of tables to be joined includes using the adjusted table size for the table. The examining the invoked database query includes identifying, by a host node external to the at least one data node, a user associated to the database query, where the method includes using the zone data and one or more security association table stored on a storage system, an access privilege attribute of the user in reference to the table, and performing the excluding in dependence on the access privilege attribute. The examining the invoked database query includes identifying, by a host node, a user associated to the database query and a row secure table (rst) referenced in a join clause of the database query, where the method includes using the zone data and one or more security association table stored on a storage system of the host node, an access privilege attribute of the user in reference to the RST, and performing the excluding in dependence on the access privilege attribute. The examining the invoked database query includes identifying, by a host node, a user associated to the database query and a row secure table (RST) referenced in a join clause of the database query, where the method includes using the zone data and one or more security association table stored on a storage system of the host node, an access privilege attribute of the user in reference to the RST, where the method includes the host node generating an execution plan for executing the database query, where the generating includes establishing a table order of the RST and a second table to be joined by execution of the join clause, where the establishing a table order of the RST and a second table to be joined by execution of the join clause includes using an adjusted table size of the RST, and where the adjusted table size of the RST is determined in dependence on the access privilege attribute of the user in reference to the RST. Implementations of the described techniques may include hardware, a method or process, or computer software on a computer-accessible medium.

One general aspect includes a computer readable storage medium readable by one or more processing circuit and storing instructions for execution by one or more processor for performing a method may include: examining an invoked database query for execution on a database; scanning zone data from at least one data node of the database in dependence on the examining, the at least one data node of the database having a storage system and storing in the storage system table data of a table, where security tags are associated to respective rows of the table, and where the zone data specifies attributes of storage of the table within respective storage system extents of the storage system; identifying, using the zone data, at least one excludible extent of the storage system extents; and excluding the at least one excludible extent from an IO data access operation in processing of the invoked database query. Other embodiments of this aspect include corresponding computer systems, apparatus, and computer programs recorded on one or more computer storage devices, each configured to perform the actions of the methods.

One general aspect includes a memory; at least one processor in communication with the memory; and program instructions executable by one or more processor via the memory to perform a method may include: examining an invoked database query for execution on a database; scanning zone data from at least one data node of the database in dependence on the examining, the at least one data node of the database having a storage system and storing in the storage system table data of a table, where security tags are associated to respective rows of the table, and where the zone data specifies attributes of storage of the table within respective storage system extents of the storage system; identifying, using the zone data, at least one excludible extent of the storage system extents; and excluding the at least one excludible extent from an IO data access operation in processing of the invoked database query. Other embodiments of this aspect include corresponding computer systems, apparatus, and computer programs recorded on one or more computer storage devices, each configured to perform the actions of the methods.

Certain embodiments herein may offer various technical computing advantages involving computing advantages to address problems arising in the realm of computer networks. Particularly, embodiments herein can speed performance of database operations with use of enhanced scan data. Data nodes in communication with a host node can perform a zone data process to extract statistical data in respect to storage system extents. A host node can scan the enhanced zone data and can examine the enhanced zone data in the development of an execution plan. The host node can perform the execution plan with use of query command data transmissions to the data nodes. In examining zone data, a host node can identify one or more storage system extent which can be excluded from a database IO data access operation. A host node can exclude identified excludible extents from IO data access operations when performing of scanning of storage system extents for generation of an execution plan. A host node alternatively or additionally can exclude identified excludible extents from IO data access operations subsequent to determination of an execution plan when executing a database query according to an execution plan. Embodiments herein recognize that latencies associated with a JOIN process for joining tables can be reduced by establishing an ordering of tables for joining so that a smaller table for joining precedes a larger table for joining. According to one scenario, a host node running a planning process can include a host node providing an ordered list of tables ranked by table size for use in execution of a database query. In providing the ordered list of table sizes, host node 110 can use an adjusted table size for at least one table to be joined. The at least one table can be provided by an RST. A host node can provide an adjusted table size using information on excluded extents from a user. That is, where a table has been subject to extent exclusion, an adjusted table size for the table, adjusted in dependence on extents excluded, can be used. An adjusted table size can be provided as the raw (unadjusted) table size, minus the number of rows excluded with the identified excludible extents. A host node running a planning process can include a host node using an ordered list of table sizes provided using at least one adjusted table size for performance of a JOIN process. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 5:
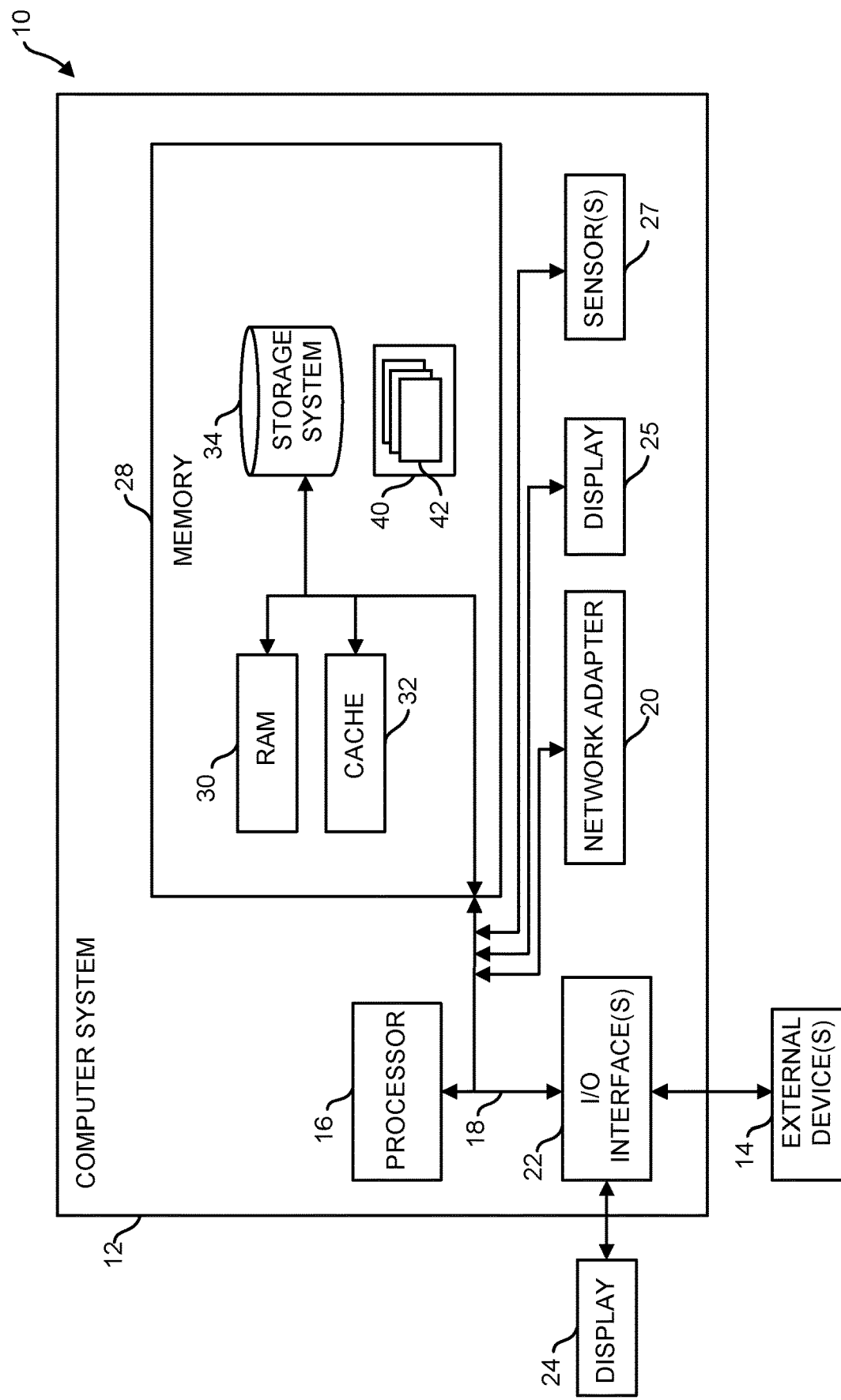
FIG. 5 depicts a computing node according to one embodiment.
Figure 6:
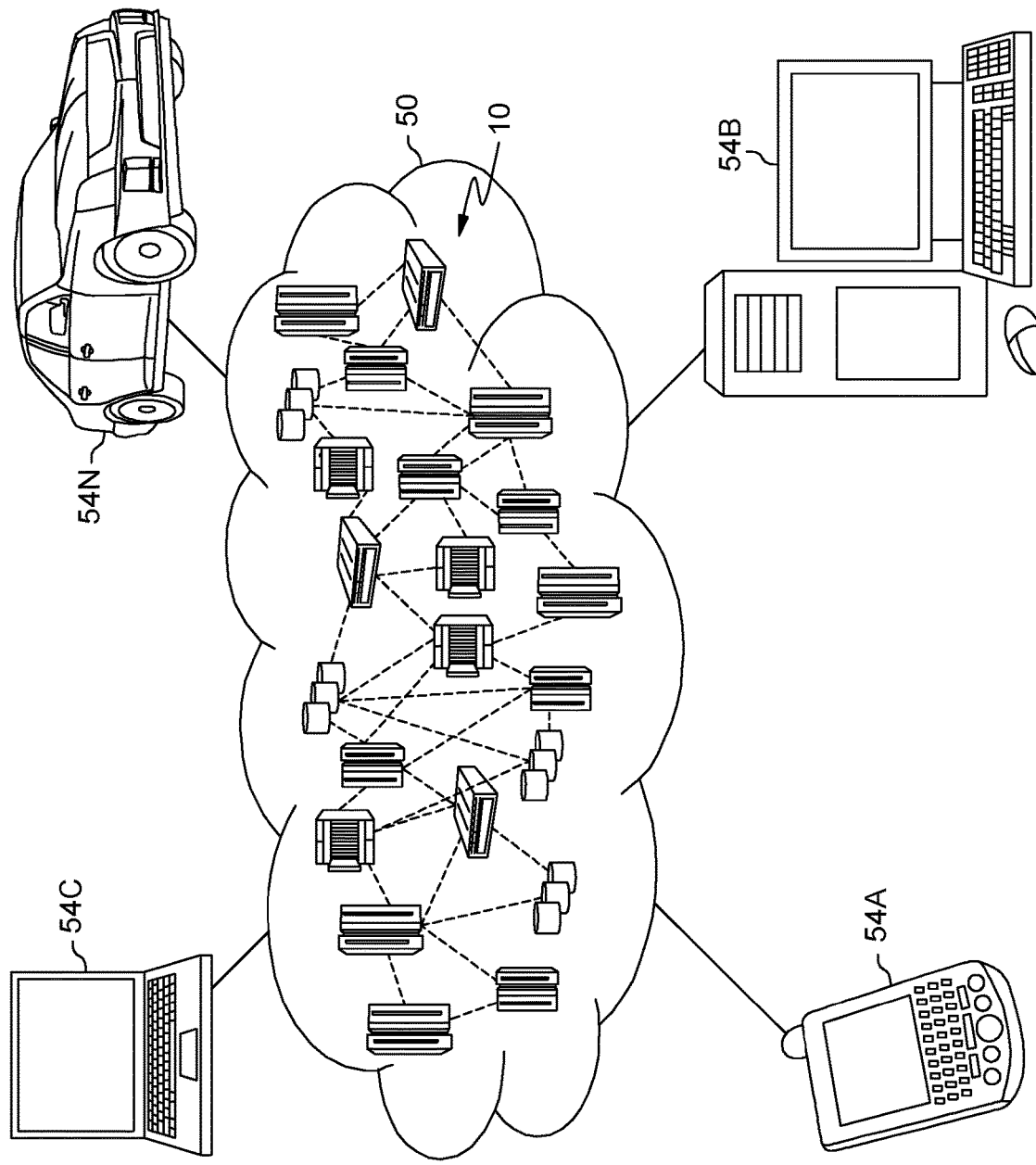
FIG. 6 depicts a cloud computing environment according to one embodiment.
Figure 7:
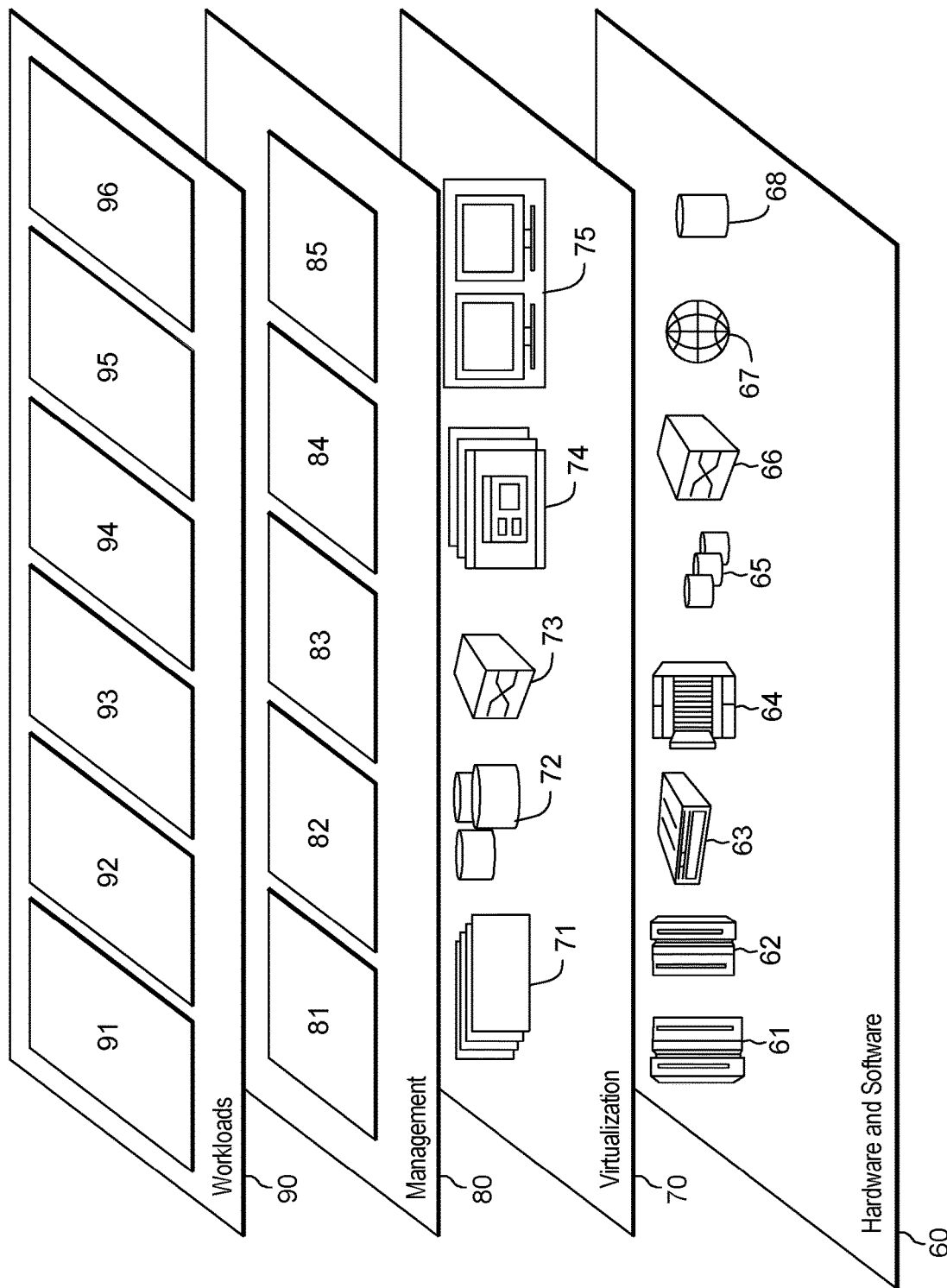
FIG. 7 depicts abstraction model layers according to one embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, host node 110 can include one or more computing node 10 and can include one or more program 40 for performing functions described with reference to host node 110 as set forth in the flowchart of FIG. 2. In one embodiment, data nodes 112A-112Z can include one or more computing node 10 and can include one or more program 40 for performing functions described with reference to data nodes 112A-112Z as set forth in the flowchart of FIG. 2. In one embodiment, UE devices 112A-112Z can include one or more computing node 10 and can include one or more program 40 for performing functions described with reference to UE devices 112A-112Z as set forth in the flowchart of FIG. 2. In one embodiment, process interface 122 can include one or more computing node 10 and can include one or more program 40 for performing functions described with reference to process interface 122 as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for query execution as set forth herein. The processing components 96 can be implemented with use of one or more program 40 described in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining an invoked database query for execution on a database;
scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system;
identifying, using the zone data, at least one excludible extent of the storage system extents; and
excluding the at least one excludible extent from an IO data access operation in processing of the invoked database query, wherein the at least one data node includes first through Nth data node physical computing nodes, wherein the scanning zone data from at least one data node of a database includes scanning, by a host node physical computing node, zone data from the first through Nth data node physical computing nodes, wherein computing nodes of the first through Nth data node physical computing nodes are external to one another, and wherein the first through Nth data node physical computing nodes are external to the host node physical computing node.

2. The computer implemented method of claim 1, wherein a first node of the first through Nth data nodes stores in a first storage system of the first node a first segment of a first table within a set of extents of the first data node defined by the respective storage system extents of the storage system.

3. The computer implemented method of claim 1, wherein a zone data process running on the at least one data node generates first zone data defining the zone data, the first zone data specifying minimum to maximum security level values of a set of extents defined by the respective storage system extents of the storage system.

4. The computer implemented method of claim 1, wherein the at least one data node of a database includes a first data node and a second data node of the first through Nth data node physical computing nodes, wherein a zone data process of a first data node generates first zone data that specifies minimum to maximum security level values of a set of extents of the first data node defined by the respective storage system extents of the storage system, wherein a zone data process of the second data node generates second zone data that specifies minimum to maximum security level values of a second set of extents of the second data node defined by respective storage system extents of the storage system of a second storage system of the second data node.

5. The computer implemented method of claim 1, wherein a zone data process running on the at least one data node generates the zone data, the zone data specifying minimum to maximum security level values of a set of extents defined by the respective storage system extents of the storage system, wherein the method includes generating an execution plan, wherein the generating an execution plan includes identifying at least one excludible extent of the set of extents stored in the storage system using the zone data.

6. The computer implemented method of claim 1, characterized by one or more of the following selected from the group consisting of (a) wherein a zone data process running on the at least one data node generates the zone data, the zone data specifying minimum to maximum security level values of a set of extents defined by the respective storage system extents of the storage system, wherein the method includes generating an execution plan, wherein the generating an execution plan includes identifying at least one excludible extent of the set of extents stored in the storage system using the zone data, wherein the method includes executing the database query using the execution plan, wherein the executing the database query comprises excluding from IO data access the identified at least one extent of the set of extents, (b) wherein the table is a row secure table (RST) distributed between a first data node and a second data node of the at least one data node, the RST having security level column that specifies for respective rows of the RST a security level to define the security tag, (c) wherein the method includes generating an execution plan for executing the database query, wherein the generating includes ascertaining a user associated to the database query, and providing an adjusted table size for the table, the adjusted table size being adjusted in dependence on the at least one excludible extent, wherein the processing the database query comprises executing the database query using the adjusted table size for the table, (d) wherein the method includes generating an execution plan for executing the database query, wherein the database query comprises a JOIN clause, wherein the generating includes ascertaining a user associated to the database query, and providing an adjusted table size for the table, the adjusted table size being adjusted in dependence on the at least one excludible extent, wherein generating the execution plan includes establishing an order of tables to be joined by execution of the JOIN clause, wherein the establishing the order of tables to be joined includes using the adjusted table size for the table.

7. The computer implemented method of claim 1, wherein the examining the invoked database query includes identifying, by the host node physical computing node, a user associated to the database query, wherein the method includes using the zone data and one or more security association table stored on a storage system, an access privilege attribute of the user in reference to the table, and performing the excluding in dependence on the access privilege attribute.

8. The computer implemented method of claim 1, wherein the examining the invoked database query includes identifying, by the host node physical computing node, a user associated to the database query and a row secure table (RST) referenced in a JOIN clause of the database query, wherein the method includes using the zone data and one or more security association table stored on a storage system of the host node, an access privilege attribute of the user in reference to the RST, and performing the excluding in dependence on the access privilege attribute.

9. The computer implemented method of claim 1, wherein a zone data process running on the at least one data node generates the zone data.

10. The computer implemented method of claim 1, wherein a zone data process running on the at least one data node generates the zone data, the zone data specifying security level values of a set of extents defined by the respective storage system extents of the storage system.

11. The computer implemented method of claim 1, wherein the table is a row secure table (RST) distributed between a first data node and a second data node of the at least one data node.

12. The computer implemented method of claim 1, wherein the table is distributed between a first data node and a second data node of the at least one data node, and wherein the table is of a type wherein different users have different access privileges.

13. The computer implemented method of claim 1, wherein the attributes of storage of the table within respective storage system extents of the storage system include attributes that specify respective minimum-maximum table data values within the respective storage system extents of the storage system.

14. The computer implemented method of claim 1, wherein generating the zone data has included examining table segment data of the table stored in storage system extents of the storage system of the data node to extract statistical data, the statistical data defining the zone data.

15. The computer implemented method of claim 1, wherein the identifying, using the zone data, at least one excludible extent of the storage system extents includes using zone data that specifies respective minimum-maximum table data values within the respective storage system extents of the storage system.

16. The computer implemented method of claim 1, wherein the identifying, using the zone data, at least one excludible extent of the storage system extents includes using zone data that specifies respective minimum-maximum table data values within the respective storage system extents of the storage system, and wherein generating the zone data specifying respective minimum-maximum table data values within the respective storage system extents of the storage system has included examining table segment data of the table stored in storage system extents of the storage system of the data node to extract statistical data, the statistical data specifying the respective minimum-maximum table data values within the respective storage system extents of the storage system.

17. A computer implemented method comprising:
examining an invoked database query for execution on a database;
scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system;
identifying, using the zone data, at least one excludible extent of the storage system extents; and excluding the at least one excludible extent from an IO data access operation in processing of the invoked database query, wherein the attributes of storage of the table within respective storage system extents of the storage system include attributes that specify respective minimum-maximum table data values within the respective storage system extents of the storage system.

18. The computer implemented method of claim 17, wherein the scanning zone data from at least one data node of a database includes scanning, by a host node, zone data from first through Nth data nodes.

19. The computer implemented method of claim 17, wherein a zone data process running on the at least one data node generates first zone data defining the zone data, the first zone data specifying minimum to maximum security level values of a set of extents defined by the respective storage system extents of the storage system.

20. A computer implemented method comprising:
examining an invoked database query for execution on a database;
scanning zone data from at least one data node of the database in dependence on the examining, the at least one data node of the database having a storage system and storing in the storage system table data of a table, wherein security tags are associated to respective rows of the table, and wherein the zone data specifies attributes of storage of the table within respective storage system extents of the storage system;
identifying, using the zone data, at least one excludible extent of the storage system extents; and
excluding the at least one excludible extent from an IO data access operation in processing of the invoked database query, wherein a zone data process running on the at least one data node generates first zone data defining the zone data, the first zone data specifying minimum to maximum security level values of a set of extents defined by the respective storage system extents of the storage system.

* * * * *